UNITED STATES PATENT OFFICE.

DENNIS J. McEVOY, OF CHARLESTOWN, MASSACHUSETTS.

IMPROVEMENT IN MEDICAL COMPOUNDS OR SALVES.

Specification forming part of Letters Patent No. 144,405, dated November 11, 1873; application filed October 23, 1873.

*To all whom it may concern:*

Be it known that I, DENNIS J. McEVOY, of Charlestown, in the county of Middlesex and State of Massachusetts, have invented an Improved Salve for the Cure of Wounds and Flesh Diseases; and I hereby declare that the following is a full, clear, and exact description thereof.

My invention consists in a salve composed of hogs' rind and lard, bees-wax, rosin, sugar, potash, and leather burned to dust, to be used for the cure of wounds and flesh diseases.

To enable others skilled in the art to understand and use my invention, I will proceed to describe the manner in which I have carried it out.

I take one-half pound of hogs' rind and one-half pound of lard, and boil them together for about three hours, after which I strain them, and add two ounces of bees-wax, one ounce of rosin, one teaspoonful of dark sugar, one-half teaspoonful of potash, and one-half ounce of leather burned to dust, and boil them in a suitable vessel over a slow fire for about two hours, and while the mixture is boiling I stir and thoroughly incorporate the whole together. I then strain the compound, and set it over a fire for about an hour, after which I strain it through a fine piece of linen, when it is ready for use.

A salve so prepared will cure all human-flesh diseases, and also scalds, burns, scratches, cuts, bruises, &c. I spread the salve upon a piece of linen, or, in some cases, rub a little with the finger upon the part affected. My improved salve may also be used for the cure of flesh diseases and wounds in horses, cattle, &c.

What I claim as my invention, and desire to secure by Letters Patent, is—

A salve composed of the within-named ingredients, compounded substantially as set forth.

Witness my hand this 18th day of October, A. D. 1873.

DENNIS J. McEVOY.

In presence of—
P. E. TESCHEMACHER,
W. J. CAMBRIDGE.